United States Patent Office 3,321,279
Patented May 23, 1967

3,321,279
HYDROGEN PEROXIDE
Selwyn Donald Williams, Luton, England, assignor to Laporte Chemicals Limited, Luton, England, a British company
No Drawing. Filed Oct. 26, 1964, Ser. No. 406,592
Claims priority, application Great Britain, Oct. 30, 1963, 42,902/63
8 Claims. (Cl. 23—207)

This invention relates to a process for the production of hydrogen peroxide.

It is well-known that hydrogen peroxide can be manufactured by a process employing the alternate reduction and oxidation of certain organic intermediates. In one such process an alkylated anthraquinone is hydrogenated in a solvent system by means of hydrogen in the presence of a catalyst to form the corresponding alkylated quinol which, after separation from the catalyst, is oxidised with oxygen to produce hydrogen peroxide with regeneration of the alkylated anthraquinone. The hydrogen peroxide is then removed usually by aqueous extraction. Such a process can be cyclic, as by recirculating the alkylated anthraquinone to the hydrogenation stage after the removal of the hydrogen peroxide.

The extracted hydrogen peroxide, however, is a crude material containing a number of impurities. Thus, the crude hydrogen peroxide is normally saturated with the solvents used in the cyclic process and it may also contain traces of the organic intermediate used. In addition to this, the aqueous hydrogen peroxide may well also contain other substances formed by the degradation of the solvent and/or organic intermediate. The presence of these other compounds may be indicated for example, by the acidity of the hydrogen peroxide, or by its non-volatile impurity content. When the extracted hydrogen peroxide is fractionally distilled in vacuo, the dissolved solvents are largely recovered in the overhead product. However the degradation compounds appear to some extent in the fractionated product but the greater proportion remains in the boiler residue.

Disadvantages may result from the presence of these organic degradation compounds in the crude aqueous extract. For example carbon compounds may pass through during distillation and appear in the distilled final product and this is undesirable for some purposes. A further disadvantage is that the presence of carbon compounds is often associated with the discolouration of the hydrogen peroxide. In addition, in concentrated solutions of hydrogen peroxide these traces have an undesirable tendency to separate out after periods of storage.

It is an object of this invention to reduce the impurity content of such hydrogen peroxide.

The invention provides a process for the purification of hydrogen peroxide which has been produced in a cyclic process involving the alternate reduction and oxidation of a solution of an organic intermediate, wherein the hydrogen peroxide is treated with at least one organic solvent mixture which contains at least one hydrocarbon solvent constituent and at least one polar solvent constituent, and is thereafter separated from the solvent mixture.

Desirably in the solvent mixture the ratio of the hydrocarbon content to the polar solvent content is never less than 0.7:1 and preferably is at least 1:1.

Advantageously the crude hydrogen peroxide is subjected to two extraction steps, the first being with a solvent mixture in which the said ratio is about 1:1, for example in the range of 0.9:1 to 1.2:1, the second being with a solvent mixture in which said ratio is at least 2:1 desirably about 3:1 to 4:1. The first treatment has the general effect of removing hydrophilic impurity but this is accompanied by a certain amount of the polar solvent constituent of the solvent mixture being dissolved in the hydrogen peroxide. The second treatment has the dual effect of removing from the hydrogen peroxide both non-hydrophilic impurity and at least part of the said dissolved solvent.

From the point of view of loss of hydrogen peroxide into the extraction solvent, it is found that with solvent mixtures in accodance with the invention the loss is only slightly less, for example, about one-third, than that incurred by employing a polar solvent alone.

The Example 1 herein illustrates the advantageous results obtained by the invention as compared with extraction with single solvents.

Suitable solvents for use as the hydrocarbon constituent are xylene, or mixtures of aromatic hydrocarbons sold under the trade names "Aromasol" (B.P. >145° C.), or "Shellsol A" (B.P. >185° C.); higher alkanes for example $C_7$ to $C_{10}$ alkanes such as heptane and decane; cyclohexane. Suitable solvents for use as the polar constituent are methylcyclohexyl acetate; diisobutyl carbinol; decanol.

In a preferred embodiment of this invention, the crude hydrogen peroxide is given a two-step treatment of the type referred to above. The solvent mixtures are two fractions derived from a cyclic hydrogen peroxide manufacturing process employing an organic solvent mixture of hydrocarbon and polar constituents. After being used on the crude hydrogen peroxide the solvent mixtures are returned to the cyclic process. The impurities which the solvent mixtures contain will thus be incorporated into the cycle. However, it is surprisingly found that the impurities are revertible by the regeneration step which is normally incorporated into the cycle, and this of course tends to reduce or eliminate build-up of impurity. These regeneration steps are well-known in such cyclic processes and will not be described further herein. It is to be understood that the invention includes within its scope cyclic processes for producing hydrogen peroxide is thereafter purified as described herein.

The solvent fractions employed in accordance with this embodiment of the invention can be obtained from any suitable stage of the cyclic process for producing hydrogen peroxide. Thus, for example, they can be taken from the gas effluent line from the oxidiser. Two quite distinct fractions can be obtained. The first, formed by condensation in the effluent line, normally has a ratio of hydrocarbon:polar constituents of about 1.5:1, although this ratio can obviously be varied if desired by altering the condensation conditions. The second is obtained from the carbon absorption-beds in the effluent line, and normally has said ratio about 4:1, although again this may be varied as desired. As a further example the fractions can be derived directly from the solvent of the cycling solution. One suitable way of deriving these fractions is to flash them off from the feed to or effluent from the herein mentioned regeneration step which is normally incorporated into a cyclic process for producing hydrogen peroxide.

The relative volumes of solvent mixture used can vary considerably. Thus the ratio solvent mixture:crude hydrogen peroxide may be as much as 1:1, or as little as 1:100, even 1:200. Whenever possible it is desirable to conduct the impurity extraction as a countercurrent process. It is convenient to work at temperatures of from 20 to 25° C. although higher temperatures may be employed if desired.

Advantages arising from employment of this preferred embodiment may be briefly stated as follows:

(1) The solvent mixture used for extraction is derived from the cyclic process and is returned to it without upsetting the solvent balance within the cycle. (2) The impurity extracted into the solvent is reverted to useful hydrogen peroxide-producing material, by a well-known regeneration process. (3) Whilst a purely hydrocarbon solvent might possibly give an equally efficient extraction, use of this one solvent alone might upset solvent balance in the cycle if returned to it, or if not returned, might require expensive recovery treatment. (4) Advantages over polar solvent alone are that no further treatment of the hydrogen peroxide is necessary to remove solvent dissolved in hydrogen peroxide, and less hydrogen peroxide itself is extracted into the solvent and either recycled—if the polar solvent is fed back to the cycle—or lost, if another recovery system is employed.

The following examples illustrate the invention.

Example 1

This example compares the results obtained using a solvent mixture in accordance with the invention, with results obtained using a single solvent. The impurity figures relate to non-volatile impurity, that is to say, impurity which remains even after concentration of the crude hydrogen peroxide to 40 of its original volume. In each case the solvent:crude hydrogen peroxide ratio was 1:1. The hydrogen peroxide was obtained from a cyclic process employing 2-ethyl anthraquinone in a hydrocarbon/ester solvent mixture. The impurity figures given are measured as carbon.

|     | Mg.p.l. |
| --- | --- |
| (a) Initial impurity content | 580 |
| After treatment with xylene | 450 |

There was negligible extraction of hydrogen peroxide into the xylene.

|     | Mg.p.l. |
| --- | --- |
| (b) Initial impurity content | 580 |
| After treatment with methyl cyclohexyl acetate | 390 |

About 2% of the hydrogen peroxide was extracted into the methyl cyclohexyl acetate.

|     | Mg.p.l. |
| --- | --- |
| (c) Initial impurity content | 580 |
| After treatment with 1:1 mixture of xylene and methyl cyclohexyl acetate | 370 |

Less than 0.5% of the hydrogen peroxide was extracted into the solvent mixture.

Example 2

This example compares, on the general lines of Example 1, the results obtained in relation to removal of quinone-like materials from two samples of crude hydrogen peroxide. In each case the solvent:crude hydrogen peroxide ratio was 1:30; and in each case the figures are measured in quinones.

|     | Mg.p.l. |
| --- | --- |
| (i) Initial impurity level (L) | 12.4 |
| L, after treatment with | |
| (a) Aromasol | 1.2 |
| (b) Methyl cyclohexyl acetate | 3.3 |
| (c) 1:1 mixture of (a) and (b) | 0.8 |
| (ii) Initial impurity level (L') | 3.2 |
| L', after treatment with | |
| (a) Aromasol | 0.6 |
| (b) Methyl cyclohexyl acetate | 0.8 |
| (c) 1:1 mixture of (a) and (b) | 0.2 |

Example 3

The following results relate to removal of impurity from crude hydrogen peroxide by treatment first with a solvent mixture of about 1.5:1 methyl cyclohexyl acetate: Aromasol, and then with a mixture of about 1:4 ratio. In each case the treatment was conducted countercurrently and the average solvent:crude hydrogen peroxide ratio was about 1:100. The figures are measured as carbon.

| Initial level (mg. p. l.) | After the two treatments (mg. p. l.) |
| --- | --- |
| 310 | 220 |
| 300 | 225 |
| 220 | 190 |
| 260 | 195 |

What I claim is:

1. In a process for producing hydrogen peroxide in which organic intermediate is subjected to hydrogenation in a solvent system in the presence of a catalyst, the organic intermediate is separated from the catalyst after hydrogenation and subsequently oxidized with oxygen to produce hydrogen peroxide and said hydrogen peroxide is then removed from said solvent system by aqueous extraction, the improvement comprising treating the hydrogen peroxide after that said removal with at least one organic solvent mixture which contains at least one hydrocarbon solvent constituent and at least one polar solvent constituent, subsequntly separating solvent mixture and hydrogen peroxide to thereby obtain hydrogen peroxide having reduced impurities.

2. The process of claim 1 wherein the ratio of hydrocarbon solvent to polar solvent in the organic solvent mixture is at least 0.7 to 1.

3. In a process for the production of hydrogen peroxide in which an alkylated anthraquinone is hydrogenated in a solvent system by means of hydrogen in the presence of catalyst to form the corresponding alkylated quinol, said alkylated quinol is separated from the catalyst and is then subsequently oxidized with oxygen to produce hydrogen peroxide with regeneration of alkylated anthraquinone and the hydrogen peroxide is then removed by extraction, the improvement comprising treating the hydrogen peroxide thus removed with a solvent mixture containing at least one hydrocarbon solvent constituent and at least one polar solvent constituent to remove impurities contained in the hydrogen peroxide, thereafter separating from the solvent mixture the hydrogen peroxide so contacted to recover a hydrogen peroxide substantially depleted of said impurities.

4. The process of claim 3 wherein the hydrocarbon solvent content to the polar solvent content in the organic solvent mixture is at least 0.7 to 1.

5. In a process for producing hydrogen peroxide in which an anthraquinone is hydrogenated in the solvent system by means of hydrogen in the presence of catalyst to form the corresponding quinol, the quinol separated from the catalyst and is subsequently oxidized with oxygen to produce hydrogen peroxide, said hydrogen peroxide being then extracted and separated from the solvent, the improvement comprising treating the hydrogen peroxide thus removed with an organic solvent mixture containing at least one hydrocarbon constituent and at least one polar constituent to thereby remove impurities from said hydrogen peroxide, repeating the treatment with a second solvent mixture containing a hydrocarbon constituent and at least one polar constituent and separating the resulting hydrogen peroxide substantially depleted of impurities from the solvent from the second solvent mixture.

6. The method of claim 5 wherein the hydrocarbon solvent to the polar solvent content of said first mixture is from 0.9 to 1.2 to 1 and the organic solvent mixture employed for the second step has a ratio of hydrocarbon solvent to polar solvent content of at least 2 to 1.

7. In a process for the production of hydrogen peroxide in which an organic intermediate is subjected to hydrogenation with elemental hydrogen in the presence of a catalyst in a first step, the resulting mixture subsequently oxidized in a second step to produce hydrogen peroxide, said hydrogen peroxide being extracted from said organic intermediate, the improvement comprising treating the hydrogen peroxide so extracted by treating it with a solvent mixture containing at least one hydrocarbon constituent and at least one polar constituent, separating hydrogen peroxide from the solvent after said treatment and recovering a hydrogen peroxide product substantially depleted of impurities.

8. The method of claim 7 wherein the ratio of hydrocarbon solvent to polar constituent is 0.7 to 1.

References Cited by the Examiner

UNITED STATES PATENTS

| | | | |
|---|---|---|---|
| 2,668,753 | 2/1954 | Harris et al. | 23—207 |
| 2,768,066 | 10/1956 | Dawsey et al. | 23—207 |
| 2,886,416 | 5/1959 | Cox et al. | 23—207 |
| 3,043,666 | 7/1962 | Siwinski | 23—207.5 |

OSCAR R. VERTIZ, *Primary Examiner.*

H. S. MILLER, *Assistant Examiner.*